No. 855,591. PATENTED JUNE 4, 1907.
A. SCHALEK.
PHOTOGRAPHIC FILM HOLDER.
APPLICATION FILED SEPT. 8, 1906.
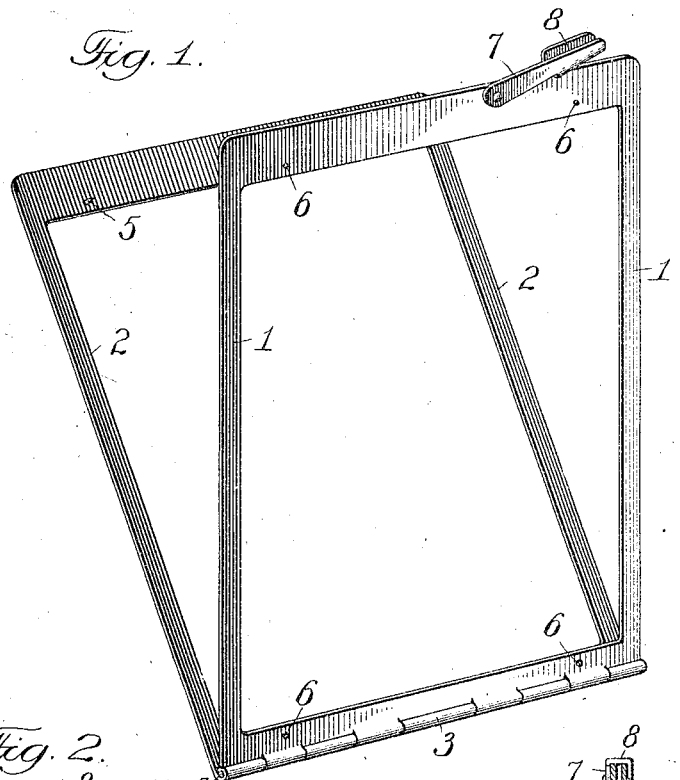
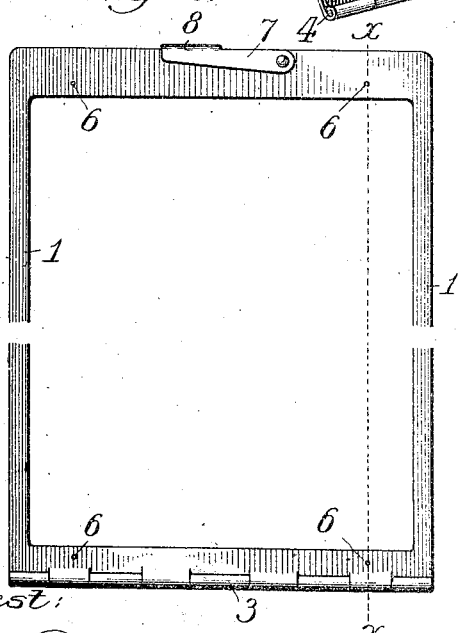
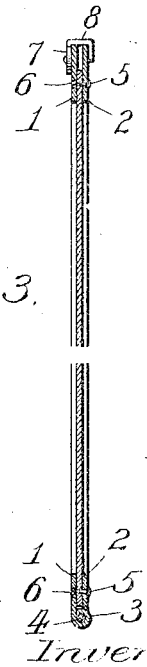

UNITED STATES PATENT OFFICE.

ALFRED SCHALEK, OF CHICAGO, ILLINOIS.

PHOTOGRAPHIC-FILM HOLDER.

No. 855,591.     Specification of Letters Patent.     Patented June 4, 1907.

Application filed September 8, 1906. Serial No. 333,774.

*To all whom it may concern:*

Be it known that I, ALFRED SCHALEK, a citizen of the United States of America, and a resident of Chicago, in the county of Cook and State of Illinois, have invented certain new and useful Improvements in Photographic-Film Holders, of which the following is a specification.

This invention relates to that class of holders employed for holding photographic films during the developing and fixing processes, and has for its object to provide a simple and effective structural formation and combination of parts wherewith the film is held in a straight and flat condition, and in a positive and efficient manner during the exposure to chemical treatment in the photographic baths, all as will hereinafter more fully appear.

In the accompanying drawings:—Figure 1 is a perspective view of the holder in a partially opened condition. Fig. 2 is a front elevation of the holder. Fig. 3 is an enlarged detail section on line $x$—$x$, Fig. 2.

Similar numerals of reference indicate like parts in the different views.

Referring to the drawings, 1 and 2 are counterpart flat rectangular holding frames of rigid sheet metal or other equivalent material adapted to resist the corrosive action of the developing and fixing baths.

3 is a hinge connecting the frames 1 and 2 together at one end. Such hinge preferably consists of a series of knuckles extending the entire width of the respective frames and pivotally connected together by a pintle pin 4 passing centrally through the entire series of knuckles.

5 are holding or impaling pins permanently attached to one of the frames aforesaid and adapted to project into corresponding holes or orifices 6, in the other of the said frames.

7 is a clasp or clamp pivotally attached to one of the frames aforesaid and provided at its free end with a U shaped keeper 8, which, when the two frames are closed together, is adapted to engage over the free ends of the frames to fixedly hold the same together in their closed condition.

In practical use, the photographic sheet film of a size corresponding to the present holder, is placed between the frames 1 and 2, which are then closed together; such closing action causes the holding pins 5 to pass through or impale the film sheet to cause a substantial and effective holding of the same in place. After such closing and film impaling operations the clasp or clamp 7 is moved to engage the frames to hold the same in such closed condition until again released.

Having thus fully described my said invention, what I claim as new and desire to secure by Letters Patent, is:—

1. A photographic film holder comprising a pair of counterpart frames hinged together at one end and provided with a catch at the other end, one of said frames being provided with a series of impaling pins and the other frame with a series of orifices to receive said pins.

2. A photographic film holder comprising a pair of counterpart frames hinged together at one end by a series of knuckles extending the width of the holder and connected by a pintle, and provided with a catch at the opposite end, one of said frames being provided with a series of impaling pins and the other frame with a series of orifices to receive said pins.

Signed at Chicago, Illinois, this 4th day of September, 1906.

ALFRED SCHALEK.

Witnesses:
   ROBERT BURNS,
   HENRY MOE.